April 21, 1964

R. C. WILSON 3,129,635

SPAN TRACK-TO-GUIDE ARM LATCH

Original Filed Oct. 22, 1959

INVENTOR
Richard C. Wilson

Q. Barlow Warner
Walter G. Finch
ATTORNEYS

April 21, 1964 R. C. WILSON 3,129,635
SPAN TRACK-TO-GUIDE ARM LATCH
Original Filed Oct. 22, 1959 7 Sheets-Sheet 2
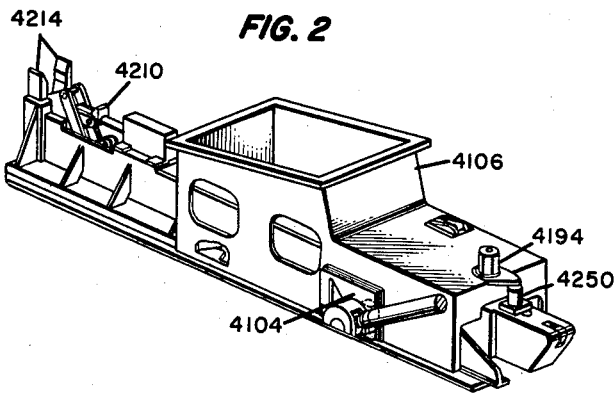
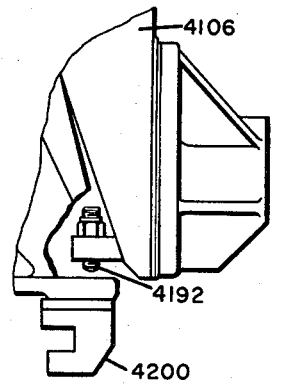
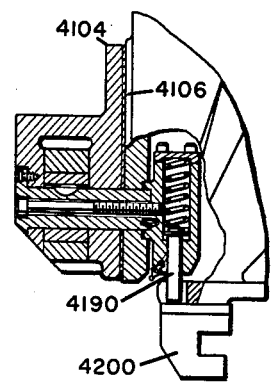

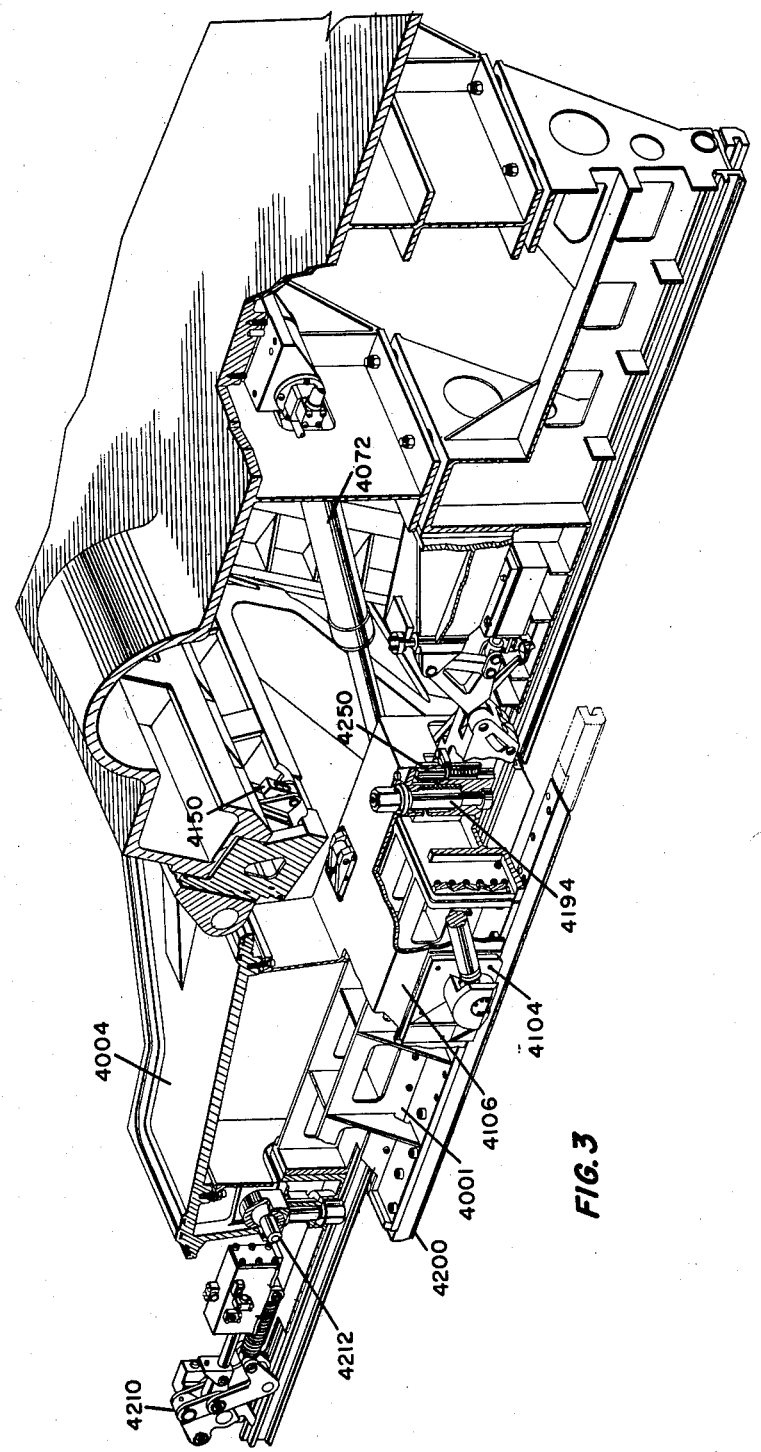

April 21, 1964   R. C. WILSON   3,129,635
SPAN TRACK-TO-GUIDE ARM LATCH
Original Filed Oct. 22, 1959   7 Sheets-Sheet 4

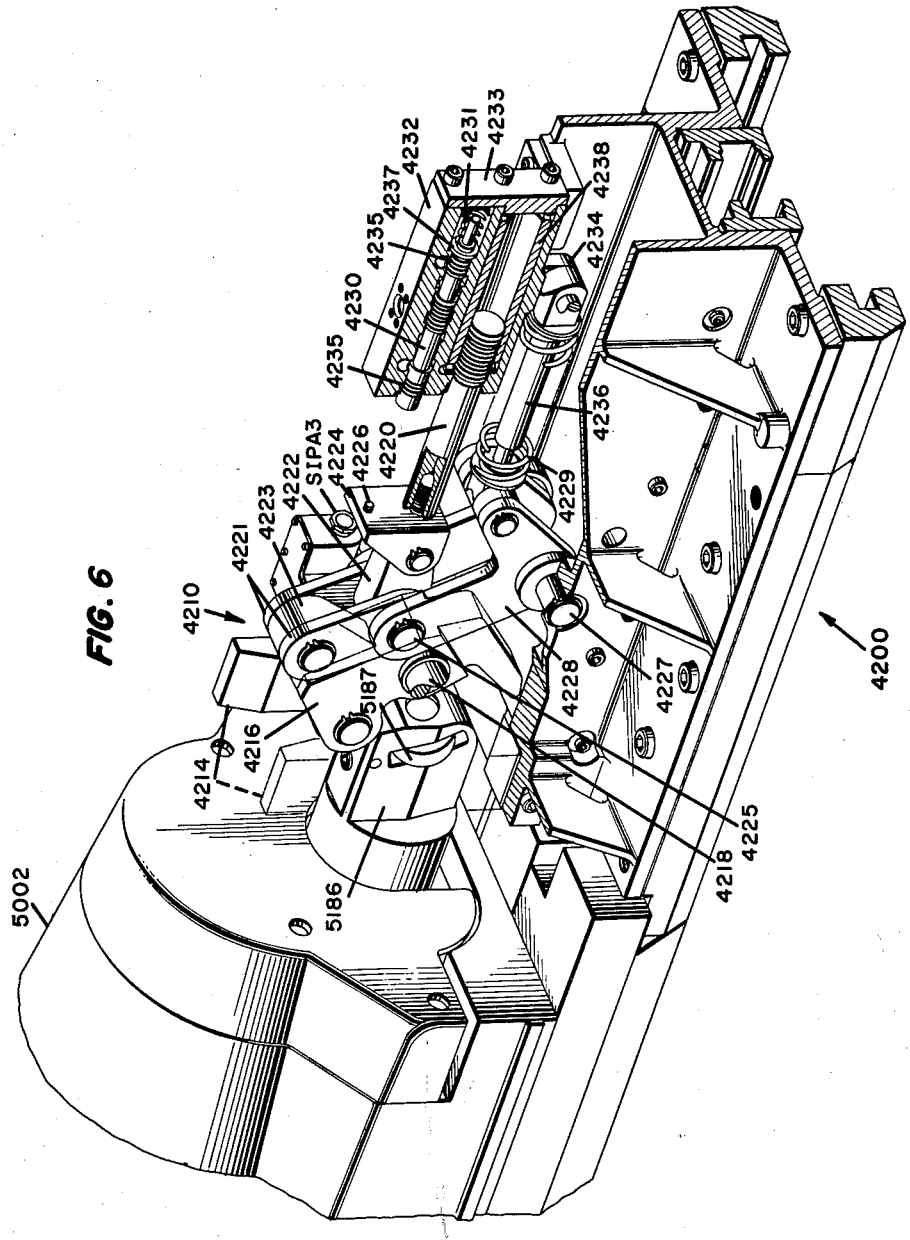

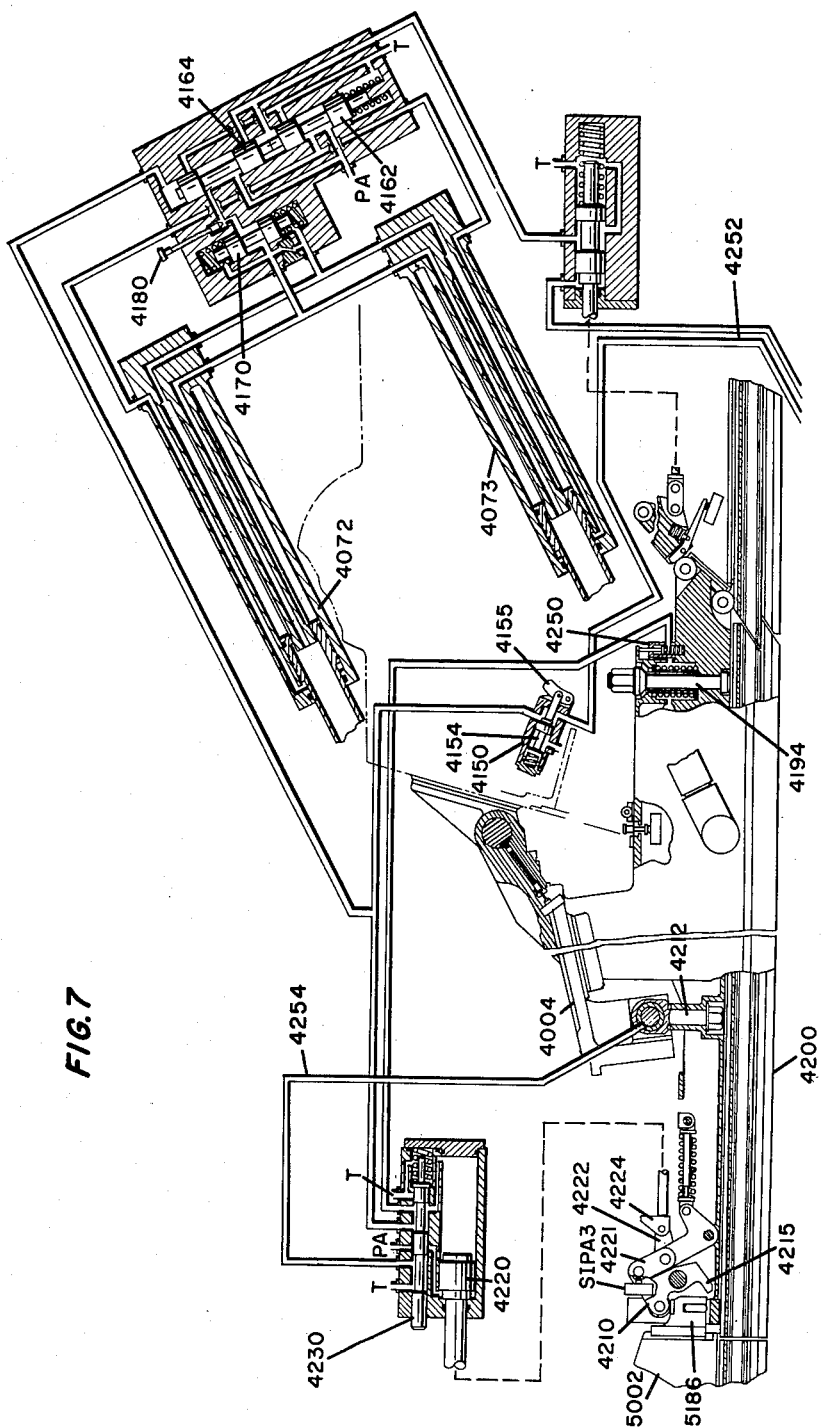

April 21, 1964 R. C. WILSON 3,129,635
SPAN TRACK-TO-GUIDE ARM LATCH
Original Filed Oct. 22, 1959 7 Sheets-Sheet 7
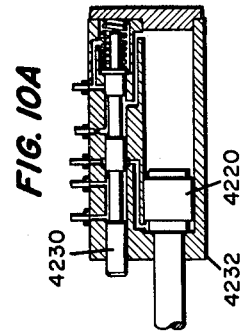
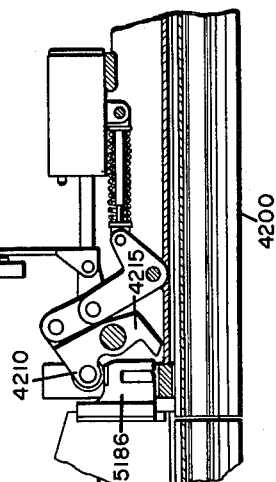
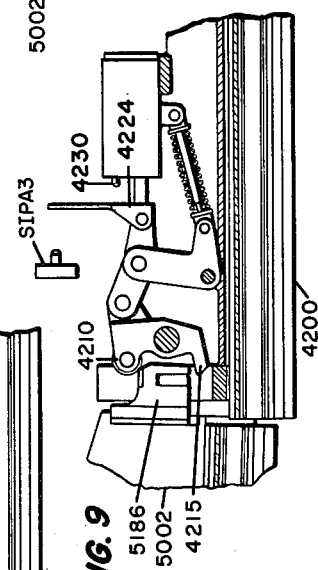
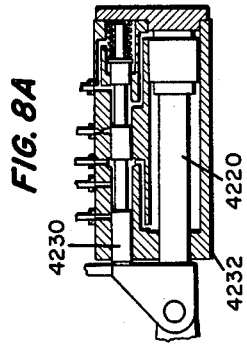
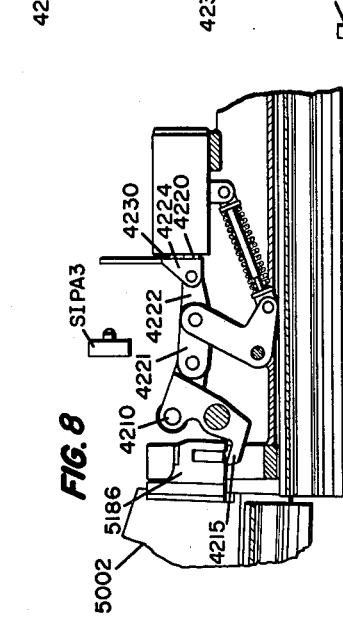

United States Patent Office 3,129,635
Patented Apr. 21, 1964

3,129,635
SPAN TRACK-TO-GUIDE ARM LATCH
Richard C. Wilson, Champlin, Minn., assignor, by mesne assignments, to the United States of America as represented by the Secretary of the Navy
Original application Oct. 22, 1959, Ser. No. 848,163. Divided and this application Dec. 21, 1959, Ser. No. 861,161
7 Claims. (Cl. 89—1.7)

This invention relates generally to railways, and more particularly it pertains to latching mechanisms for securing together separable tracks of a tramway. This application is a division of U.S. patent application Serial Number 848,163, filed October 22, 1959, by Myron J. Bauer et al., for a "Guided Missile Launching System."

In a guided missile launching system, such as described in the above-mentioned patent application, it is often required to connect the missile weapon supporting and guide arm tracks of a launcher to the tramway tracks of a folding span track in a missile weapon feeder system. For this purpose, an automatic latch of high reliability and unique characteristics is required.

In the guided missile launching system of the patent application referred to above, there is disclosed a guide arm and span track arrangement in which the automatic latch of the present application forms an important part.

It is object of this invention, therefore, to provide a toggle action type latch for securing abutting ends of a railway together which has both mechanical tripping as well as hydraulic tripping engagement aids.

Another object of this invention is to provide a tripping latch valve which triggers a hydraulically operated latch and which provides additional interlocked hydraulic control for aligning of a span track and the clamping thereof to a guide arm of a launcher.

These and other objects and attendant advantages of this invention will become more readily apparent and understood from the following specification and accompanying drawings in which:

FIG. 2 is a dimetric view of the span track-to-guide arm latch and stabilizers therefor;

FIG. 2a is a detail view of the spring-biased stabilizing plunger forming part of the span track shown in FIG. 2;

FIG. 2b is a detail view of the spring stops forming part of the span track shown in FIG. 2;

FIG. 3 is a dimetric view, in longitudinal cross section, of a span track;

FIG. 6 is a dimetric view, partly cut away, of the span track-to-guide arm latch in an engaged position;

FIG. 7 is a hydraulic schematic of an upper blast door in an open position;

FIG. 8 is a side elevation, partly in cross section, of the span track-to-guide arm latch in a contacting position;

FIG. 8a is a detail view of the latch piston and tripping valve in contact position;

FIG. 9 is a side elevation, partly in cross section, of span track-to-guide arm latch in a rotating position;

FIG. 9a is a detail view of the latch piston and tripping valve in rotating position;

FIG. 10 is a side elevation, partly in cross section, of span track-to-guide arm latch in a latched position; and FIG. 10a is a detail view of the latch piston and tripping valve in latched position.

Figure 1:
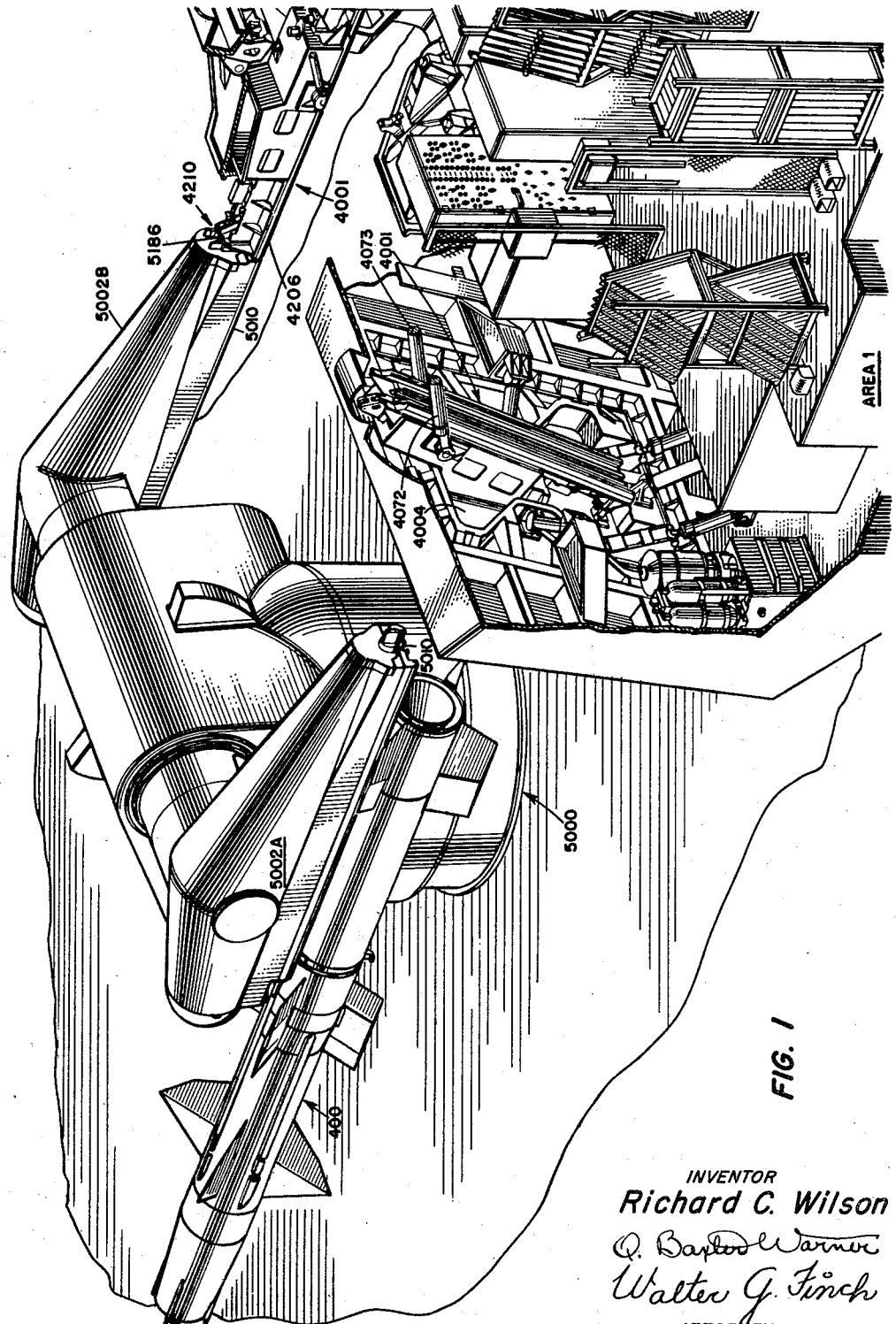
FIG. 1 is a dimetric view, with parts removed, of part of a guided missile launching system showing the span track-to-guide arm latch incorporating features of the present invention.

Referring now to FIG. 1 of the drawing, there is shown generally a pair of span tracks 4001 which are used to transport and load missile weapons 400 from an assembly Area 1 onto a dual arm guided missile launcher 5000. The launcher 5000 is provided with a pair of left and right guide arms 5002A and 5002B, respectively, each having rails 5010 onto which the missile weapons 400 slide and are thereby supported.

A pair of power pistons 4072 and 4073 are provided for raising and lowering a span track assembly 4001 to each guide arm 5002A and 5002B. The span track assembly 4001 at the left of FIG. 1, is shown in its lowered position, while the span track 4001 at the right is shown raised and latched to the right guide arm 5002B by means of a span track-to-guide arm latch 4210 of novel design.

Each span track assembly 4001 consists of a span track support 4106, and an inner floating track 4200, as shown in FIG. 2 including the inset thereof. A spring and hydraulically tensioned centering bolt 4194, and a spring centered hydraulically clamped T-hanger 4212, shown in FIG. 3, comprise this floating support means for both the inner floating track 4200 and the span track-to-guide arm latch 4210 secured thereto.

The centering bolt 4194 supporting the aft end of the floating track 4200 is held by the span track support 4106. Both the T-hanger 4212 and the centering bolt 4194 provide floating connections which allow the floating track 4200 to align itself with the guide arm 5002 of the launcher 5000 independently of a hinged upper door 4004 to which the span track support 4106 is bolted.

Figure 4:
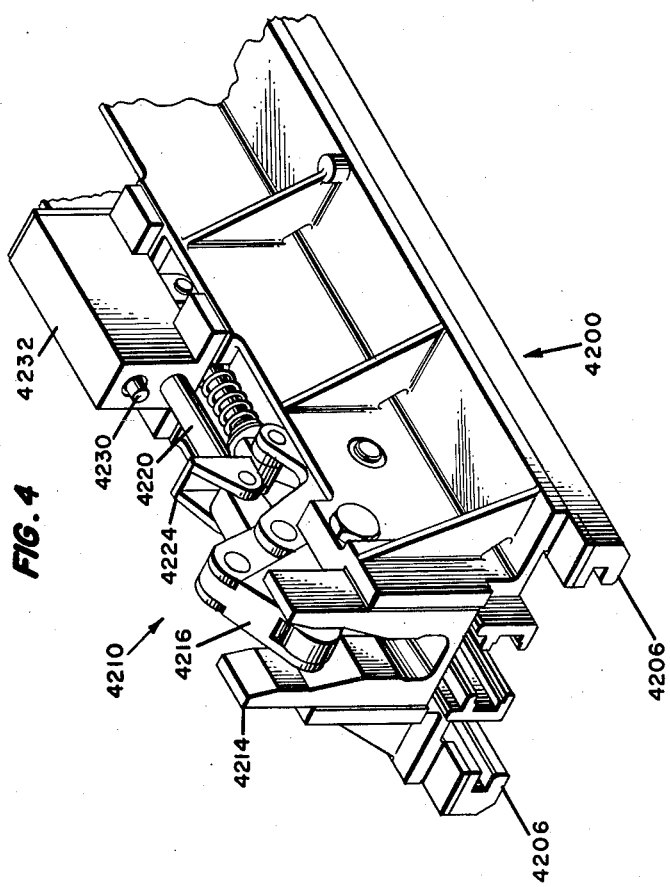
FIG. 4 is a dimetric view, with parts removed, of the span track-to-guide arm latch in an engaged position.
Figure 5:
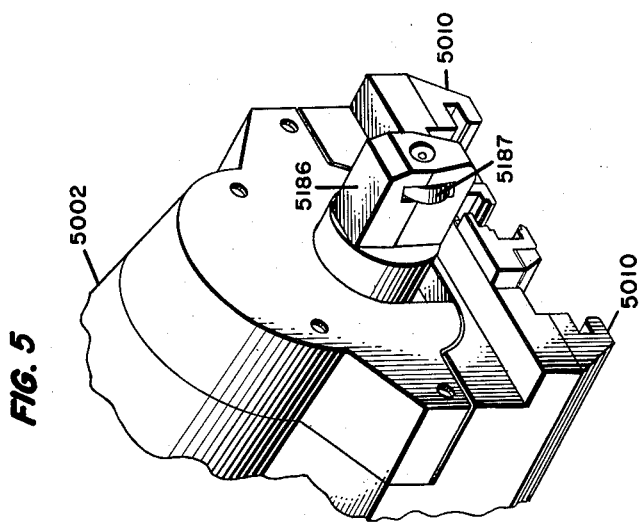
FIG. 5 is a dimetric view of a guide arm latching block.

A vertically bifurcated tapered guide block 4214 is located forward of the span track-to-guide arm latch 4210, as shown in FIGS. 2 and 4. When the span track assembly 4001 is in the stowed, lowered position (left in FIG. 1), the guide block 4214 engages a roller assembly 4216 to prevent shifting of the floating track 4200. When the span track assembly 4001 raises to the horizontal load position (right in FIG. 1), the guide block 4214 embraces a lateral guider roller 5187 of a latch block 5186 at the aft end of the guide arms 5002, as shown in FIG. 5. The span track-to-guide arm latch 4210 is hydraulically operated, and its lifts and locks the forward end of the floating track 4200 to the aft end of the guide arm 5002, thus aligning the rails 5010 to a similar pair of skid tracks 4206 on the floating track 4200.

The span track support 4106, shown best in FIG. 2, is a steel weldment bolted to the inner face of the upper door 4004. The span track support 4106 is solidly attached to the upper door 4004, and it is provided with a pair of power piston brackets 4104 for the previously mentioned upper door power pistons 4072 and 4073 which are bolted to each side thereof.

A spring plunger 4190, as shown in the right inset of FIG. 2, is attached to either side of the inner wall of the span track support 4106. This spring and plunger 4190 stabilizes the roll or tilt of the floating span track 4200.

Screw stops 4192, shown in the left inset of FIG 2, which are located forward of the spring and plunger 4190, are utilized as positive stops to limit roll or tilt of the floating span track 4200. These stabilizing mechanisms prevent serious lateral tilt of the floating span track 4200 when it is stowed, or when the floating span track assembly 4001 is moved to or from the horizontal position.

In latching, the mechanism of the span track-to-guide arm latch 4210 rotates counterclockwise, as viewed from the side in FIG. 4, and it actually lifts the floating span track 4200 slightly to align it vertically with the launcher guide arm 5002. When engaged, the span track-to-guide arm latch 4210 maintains this vertical and lateral alignment of the floating span track 4200 and the launcher guide arm 5002, but it allows a small amount of longitudinal movement thereof. A small gap is intentionally provided between the span track 4200 and the launcher guide arm 5002.

The assembly for the span track-to-guide arm latch 4210, as shown best in FIG. 6, includes the latch roller assembly 4216, a pair of links 4221 and 4222, a bell-cranker lever 4228, a toggle knee pin 4225, a lever pivot pin 4227, a clevis 4224, a spring 4229, a spring guide sleeve 4236, an interlock switch SIPA3, and a valve block 4232. The valve block 4232 contains a latch piston 4220 and a tripping valve 4230.

The latch roller assembly 4216 is that portion of the span track-to-guide arm latch 4210 which engages the guide arm latch block 5186, as shown in FIGS. 5 and 6. The latch roller assembly 4216 pivots on a latch pivot pin 4218. This latch pivot pin 4218 is held by the forward section of the floating span track 4200.

The links 4221 of the toggle arrangement are pinned to an ear 4223 extending from the latch roller assembly 4216. The links 4221 are then pinned to the link 4222 by means of the toggle knee pin 4225. The aft end of the link 4222 is pinned to the clevis 4224, which is screwed into the end of the latch piston 4220. An adjustable screw 4226, which protrudes from the upper portion of the clevis 4224 depresses the tripping valve 4230 when the latch roller assembly 4216 is disengaged.

The bellcrank-type lever 4228 is pinned to the toggle knee pin 4225, and it pivots on the lever pivot pin 4227, as shown in FIG. 6. This lever pivot pin 4227 is also held by the forward section of the floating span track 4200. When the latch piston 4220 extends, the toggle links 4221 and 4222 buckle. When the latch piston 4220 retracts, these links 4221 and 4222 straighten. In both cases, the bellcrank lever 4228 and the latch assembly 4216 will rotate.

With the bellcrank lever 4228 fully rotated in either direction, the spring arrangement pinned to the aft end of the bellcrank lever 4228 will be in an over-center position. The spring 4229, which is attached to the bellcrank lever 4228, holds the latch roller assembly 4216 in either the engaged or disengaged position unless it is moved by the latch piston 4220.

The arm actuated interlock switch SIPA3 is mounted on the inboard side of the latch roller assembly 4216, as shown in FIG. 6. When the latch piston 4220 is extended and the latch roller assembly 4216 is engaged, the head of the pin joining link 4221 to the latch ear 4223 depresses the switch arm of the interlock switch SIPA3.

The valve block 4232, as shown in FIG. 6, is bolted to the forward section of the span track 4200 directly aft of the bellcrank lever 4228. This valve block 4232 contains the span track-to-guide arm piston 4220 and the tripping valve 4230. A lug 4234, extending from the bottom of the valve block 4232, anchors the spring guide sleeve 4236. A cover 4233 which is bolted to the rear of the valve block 4232 is used as a spring retainer for a tripping valve spring 4231. In addition, the cover 4233 seals both the bores of the piston 4220 and valve 4230. Openings for connecting pipes are located at the top and sides of the valve block 4232.

The tripping valve 4230 is of a three-land plunger type, as shown in FIG. 6. It houses the tripping valve spring 4231 and ring seals 4235. The plunger of the tripping valve 4230 is fitted into the bore in valve block 4232 and it projects slightly from the forward end. The aft end of the plunger of the tripping valve 4230 is provided with a larger diameter annular flange 4237. The tripping spring 4231 is arranged to bear against this annular flange 4237 in order to hold it against a block shoulder and cause the plunger of tripping valve 4230 to extend, as shown in FIG. 6.

When, however, the adjustable screw 4226 on the clevis 4224 contacts the protruding end of the plunger of the valve 4230 and depresses it, the tripping valve 4230 is retracted. With the tripping valve 4230 retracted, the front of the latch piston 4220 is ported to tank T, while accumulator pressure fluid is ported to the clamping or centering pistons of the T-hanger 4212, shown in FIG. 7.

On the other hand, when the clevis 4224 is drawn forward and the tripping valve 4230 is extended, control fluid pressure is ported to the front of piston 4220 and to a holddown piston 4250 of the centering bolt 4194. At the same time, the centering pistons of the T-hanger 4212 are ported to tank T. Accumulator pressure fluid is always ported to the rod end of the piston 4220, regardless of position of the piston of tripping valve 4230.

The span track-to-guide arm latch piston 4220, as shown in FIG. 6, operates the span track-to-guide arm latch 4210. This piston 4220 slides within a sleeve 4238. The span track-to-guide arm latch piston 4220 extends from the valve block 4232 and it is screwed onto the clevis 4224. The rod end of this span track-to-guide arm latch piston 4220, which is of the differential area type, has a smaller area than the face end thereof and it is connected directly to accumulator pressure fluid.

When control pressure fluid is ported to the front end of the span track-to-guide arm latch piston 4220, the piston extends. As the piston 4220 extends, the toggle links 4221 and 4222 buckle and the latch roller assembly 4216 is rotated counterclockwise. At the same time, accumulator pressure fluid at the rod end of the span track-to-guide arm latch piston 4220 is forced back into the system.

The span track-to-guide arm latch piston 4220 is retracted when the control pressure fluid acting against the face of the piston 4220 is reduced to tank pressure. Accumulator fluid pressure, acting against the rod end of the piston 4220, then forces the piston 4220 to the aft end of the sleeve 4238 and causes the toggle links 4221 and 4222 to unbuckle. As links 4221 and 4222 are straightened, the latch roller assembly 4216 then rotates in a clockwise direction to release the floating span track 4200 from the launcher guide arm 5002.

The hydraulics of the span track-to-guide arm latch 4210 are interlocked with the operation of the upper door 4004. Control pressure fluid is first ported through a conduit 4252 to a door safety latch 4150, shown in FIG. 7. The control fluid pressure, acting against the front of a latch plunger 4154, retracts a latch element 4155 and releases the upper door 4004 from its closed position. When retracted, the safety latch 4150 also acts as a sequence valve, porting the control pressure fluid to the tripping valve 4230 and to a pair of upper door directional valves 4162 and 4164, shown best in FIG. 7.

The control pressure fluid ported to the upper door directional valves 4162 and 4164 shifts both of these valves downwardly, as shown in FIG. 7. When shifted, valve 4164 ports the accumulator pressure fluid past an upper door throttle valve 4180 to an upper door metering valve 4170. Upper door metering valve 4170 regulates the accumulator pressure fluid flow to the upper door power pistons 4072 and 4073.

As the upper door 4004 nears the fully open position as urged by the pistons 4072, 4073, a catch 4215 projecting from the bottom of the span track-to-guide arm latch 4210 contacts the guide arm latch block 5186, as shown in FIGS. 7, 8, and 8a. Upon contacting a lug in block 5186, the latch 4210 is caused to rotate, and, at the same time, it pulls its toggle linkage consisting of links 4221 and 4222 forward.

As the linkage composed of links 4221 and 4222 is drawn forward, the clevis 4224 releases the tripping valve 4230, which then extends, as shown best in FIGS. 9 and 9a. This causes the tripping valve 4230 to port control pressure fluid to the span track-to-guide arm latch piston 4220. The control pressure fluid ported to the face of this differential-area span track-to-guide arm latch piston 4220, causes it to extend, and force the accumulator pressure fluid at the rod end from the valve block 4232.

As piston 4220 extends, it rotates the span track-toguide arm latch 4210 further, thereby lifting the floating span track 4200 slightly and aligning it with the launcher guide arm 5002. In FIGS. 7, 10, and 10a, there are shown the floating span track 4200 latched to the guide arm 5002 and with the switch S1PA3 actuated.

When the tripping valve 4230 extends, it not only ports control pressure fluid to the span track-to-guide arms latch piston 4220, but also to the hold-down piston 4250, for the centering bolt 4194, as shown best in FIG. 7. At the same time, through a conduit 4254, tripping valve 4230 ports the diametrically opposed clamping pistons of the T-hanger 4212 to tank. With the T-hanger 4212 free to move sideways and the centering bolt 4194 clamped as a pivot, the floating span track 4200 may now shift laterally to maintain alignment of the skid tracks 4206 with the guide arm rails 5010 of the launcher 5000, as previously related.

Obviously, many other modifications and variations of the present invention are possible in light of the above teachings. It is, therefore, to be understood that within the scope of the appended claims the invention may be practiced otherwise than as specifically described.

What is claimed is:

1. In a conveyor system, a pair of tandemly arranged tramways, one of said tramways being pivotally mounted and the other tramway being stationary, a mechanism for aligning and latching said spaced tramways together, said mechanism including a latch block carried by said stationary tramway, a latch carried by said pivotally mounted tramway and mounted to pivot about an axis transverse of said pivotal tramway, guide means mounted on said pivotally mounted tramway for guiding said pivotally mounted tramway into horizontal alignment with said stationary tramway, a motor operable to connect and disconnect said latch with said latch block thereby latching or unlatching said tramways, control means operable to control the movement of said motor, said latch and said motor having a linkage means interposed therebetween, said linkage having an overcenter means which is operable to urge said latch to either said connected or disconnected position, initial movement of said linkage away from said disconnected position and toward said connected position being effected when said latch contacts said latch block as said tramways approach their aligned position, said initial movement causing asid control means to be actuated thereby causing said motor to effect complete movement of said linkage to said connected position thereby latching said tramways together.

2. The system of claim 1 wherein means are provided which normally urge said latch toward said connected or disconnected position.

3. The system of claim 2 wherein said motor is a fluid motor and said control means is a fluid valve.

4. The system of claim 3 wherein said guide means comprises a U-shaped guide block mounted on one of said members and a lateral guide roller mounted on the other of said members, whereby, upon pivoting said first member into substantial vertical alignment with said second member, said roller is engaged by said guide block to effect horizontal alignment of said members.

5. The system as set forth in claim 1 wherein said motor is a fluid motor and said control means is a fluid valve which is spring biased toward a first position, said valve when in said first position causing said motor to move said linkage to said connected position.

6. In a missile launching system having a missile launcher, arms on the missile launcher operable to support missiles in a launching position, first tramway means mounted on said arms, a missile storage means, second tramway means for conveying missiles from the storage means, the combination with said system of a spanner rail operable to be moved to a connected position wherein a continuous tramway is provided between said first and second tramway means, said spanner rail operable to be moved to a disconnected position wherein said first tramway means is disconnected from said spanner rail, a latch mounted on said spanner rail, a latch block mounted on said arm, said latch operable to engage said latch block when said spanner rail is in said connected position, a motor operable to effect movement of said latch to cause engagement or disengagement therewith, control means operable to control the operation of said motor, a projection on said latch operable to contact said arm when said spanner rail is moved into said connected position, said projection being operable upon said contact to actuate said control means thereby causing operation of said motor to effect latching of said latch and said latch block, and mating guide means on said spanner rail and said arm to insure alignment of said spanner rail and said arm when in said connected position.

7. The improvement set forth in claim 6 wherein overcenter means are provided between said latch and said motor to maintain said latch in either a latched position or an unlatched position.

References Cited in the file of this patent

UNITED STATES PATENTS

| | | |
|---|---|---|
| 1,550,140 | Bennington | Aug. 18, 1924 |
| 1,553,439 | Goldberg | Sept. 15, 1925 |
| 2,256,447 | Burke | Sept. 16, 1941 |
| 2,383,051 | Everard | Aug. 21, 1945 |
| 2,601,983 | Schoelkopf | July 1, 1952 |
| 2,642,814 | Anjeskey | June 23, 1953 |
| 2,789,472 | Warlick | Apr. 23, 1957 |